United States Patent [19]

Griffith et al.

[11] Patent Number: 4,637,305
[45] Date of Patent: Jan. 20, 1987

[54] METHOD AND COMPOSITION FOR SMOKING COMESTIBLE PRODUCTS AND SMOKED PRODUCTS PRODUCED THEREWITH

[75] Inventors: Carroll L. Griffith, Hinsdale; Albert E. Nielson, Naperville, both of Ill.

[73] Assignee: Griffith Laboratories U.S.A., Inc., Alsip, Ill.

[21] Appl. No.: 802,848

[22] Filed: Nov. 27, 1985

Related U.S. Application Data

[62] Division of Ser. No. 676,955, Nov. 30, 1984, Pat. No. 4,588,598.

[51] Int. Cl.$^4$ ............................................. A23B 4/04
[52] U.S. Cl. ...................................... 99/481; 426/312
[58] Field of Search ................ 99/481, 482, 480, 474, 99/475, 476, 473, 467, 483; 426/235, 312, 314, 315; 219/10.65, 10.41, 10.42, 10.51, 10.57, 10.49

[56] References Cited

U.S. PATENT DOCUMENTS

| 2,832,278 | 4/1958 | Taranik | 426/235 |
| 3,503,760 | 3/1970 | Allen | 99/229 |
| 3,615,729 | 10/1971 | Baker et al. | 99/229 |
| 3,763,767 | 10/1973 | Baker et al. | 99/476 |
| 3,861,292 | 1/1975 | Gillialand et al. | 99/476 |
| 3,871,353 | 3/1975 | Haug | 126/59.5 |
| 3,896,242 | 7/1975 | Moore | 426/314 |
| 3,969,996 | 7/1976 | Huang et al. | 99/476 |
| 4,359,481 | 11/1982 | Smits et al. | 426/533 |
| 4,558,196 | 12/1985 | Babasade | 99/481 |

FOREIGN PATENT DOCUMENTS 603487 8/1960 Canada.

Primary Examiner—Robert W. Jenkins
Attorney, Agent, or Firm—Hosier & Sufrin, Ltd.

[57] ABSTRACT

An apparatus for regenerating liquid smoke into vapor comprising a regenerator chamber, a regenerator member with generally vertical surfaces within the chamber, means for introducing and spreading liquid smoke on the surface, and means for heating the member to regenerate the liquid smoke into vapor.

20 Claims, 7 Drawing Figures

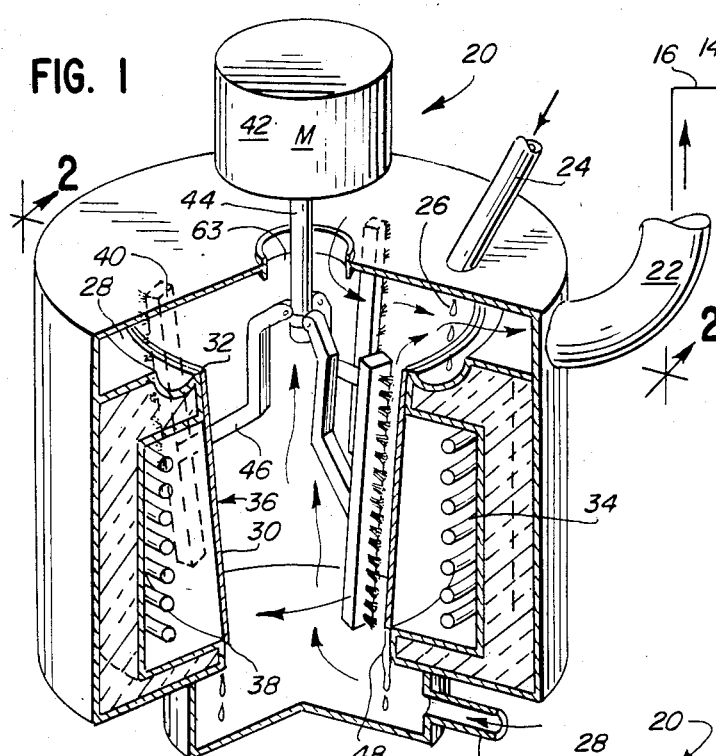
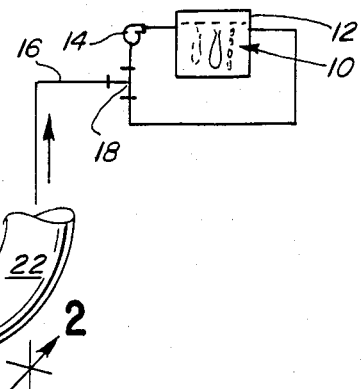
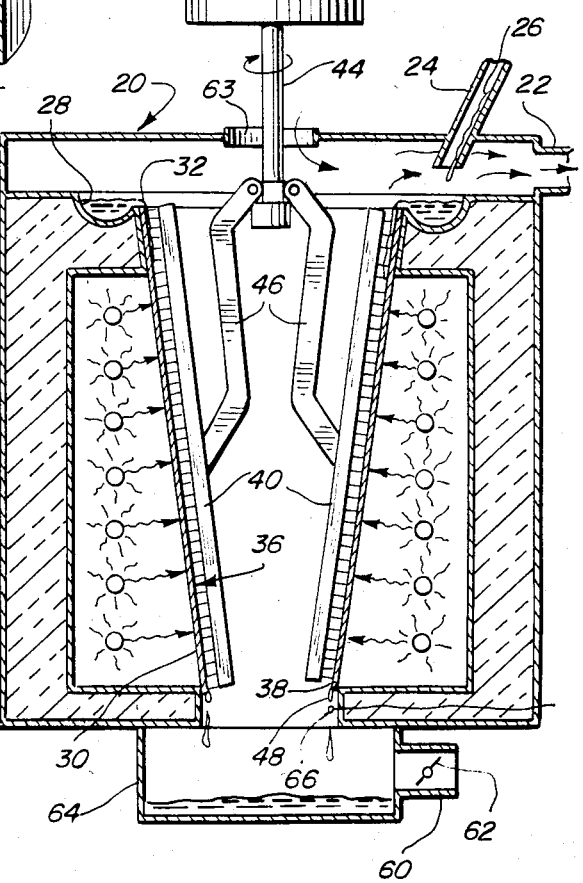
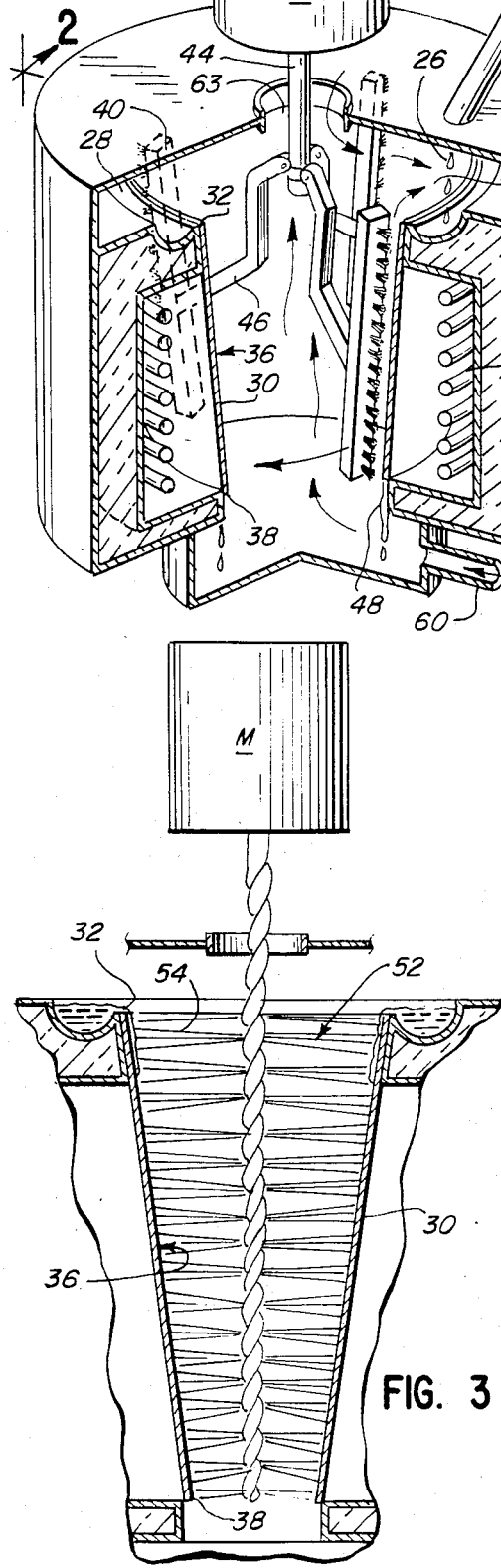
FIG. 1
FIG. 2
FIG. 3

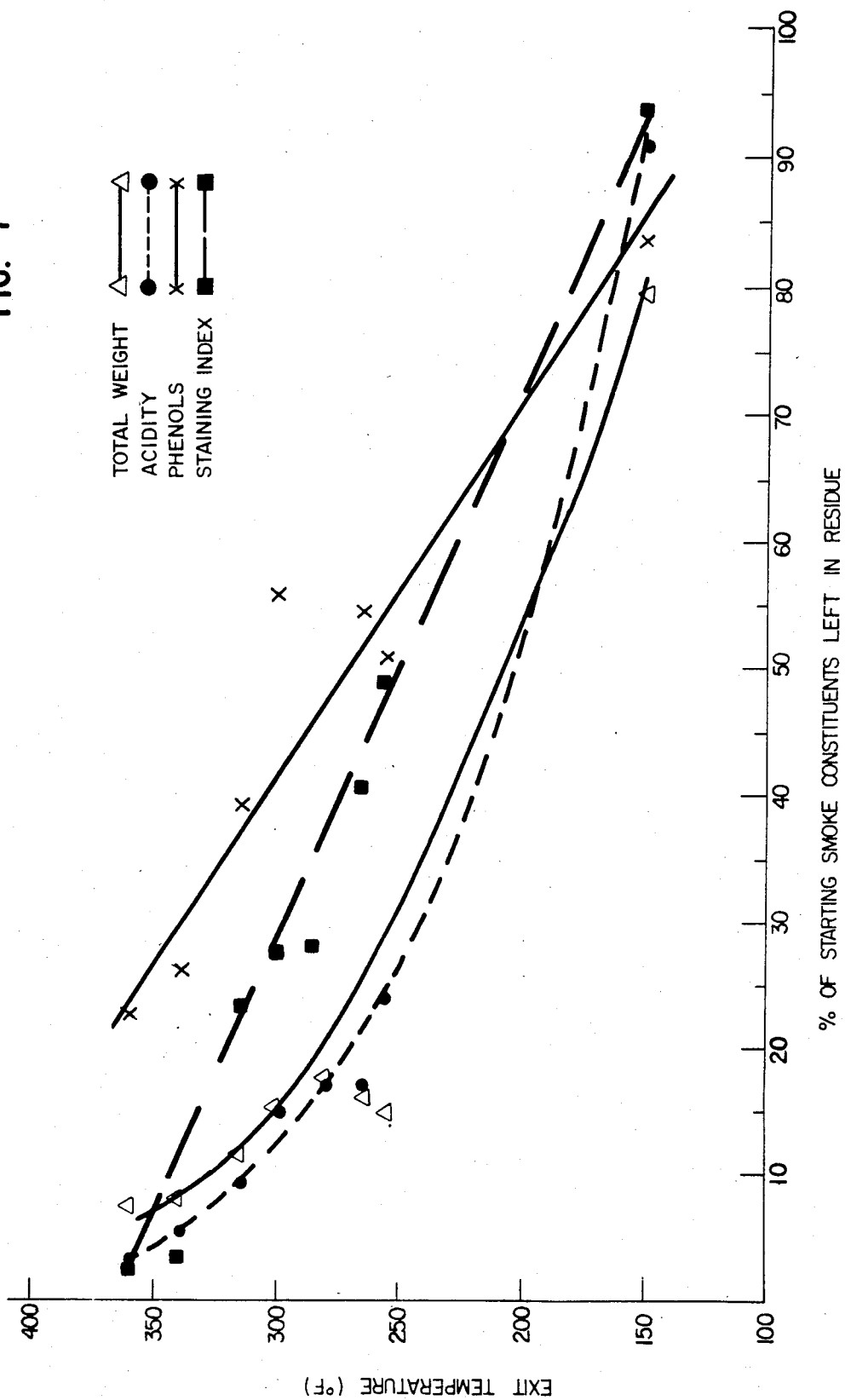

METHOD AND COMPOSITION FOR SMOKING COMESTIBLE PRODUCTS AND SMOKED PRODUCTS PRODUCED THEREWITH

This is a divisional of co-pending application Ser. No. 06/676,955 filed on Nov. 30, 1984, now U.S. Pat. No. 4,588,598.

BACKGROUND OF THE INVENTION

This invention relates generally to the smoking of comestible products to impart a desirable smokey flavor and color to the products and, more particularly, to an apparatus for producing a vapor for imparting improved smokey flavor and color to comestible products.

The smoking of comestible products, including meat, fish and cheese, by suspending the products in an enclosure through which smoke generated by the partial combustion of certain hardwoods is passed is one of the oldest forms of food preservation. It produces a product with smokey flavor and color characterisitics desired by a large segment of the world population. Unfortunately, there are drawbacks to this traditional direct smoking method.

Smoking comestible products directly with the smoke of burning hardwood requires that large quantities of hardwood chips or sawdust first be transported to the smoking site for burning and then that the large quantities of burnt residues which remain be disposed of. The concentration and density of the smoke is difficult to control in direct smoking so that there is significant variation in the flavor and color in the smoked comestible product between application runs. Finally, the direct generation of wood smoke produces copious amounts of tars, combustible flyash and carcinogens which are necessarily introduced into the comestible products.

Notwithstanding these significant drawbacks, the traditional direct smoking process has one very important advantage. The smoke produced by smoldering wood in the direct smoking process is in a form which evenly distributes itself within the smoking chamber to uniformly flavor and color the comestible products being smoked.

A relatively recent improvement in the traditional smoking process has been the development of aqueous wood smoke flavored solutions known as "liquid smoke" which are manufactured at a single large facility from the smoke produced by wood combustion and then distributed for on-site application in liquid form. Techniques for manufacturing liquid smoke are described, for example, in U.S. Pat. Nos. 3,873,741 and 3,106,473.

The advantages of the use of liquid smoke in lieu of direct smoking are myriad. On-site handling of sawdust, wood chips and ash is eliminated. Flyash and known carcinogens are removed from the liquid smoke. An increased level of control of smokey flavor and color may be achieved.

Liquid smoke may be applied by directly adding the liquid to processed comestible products during processing, by immersing the products in the liquid, by spraying or coating the liquid directly onto the comestible products or by producing a liquid smoke mist and then suspending the comestible product in the mist. Although the misting technique is presently the most widely used, it has a number of serious drawbacks.

First, liquid smoke contains tars which clog spray nozzles and adhere to smoking enclosure surfaces requiring constant monitoring of nozzle air supply pressures and significant downtime for unclogging of nozzles and cleaning of smoke enclosure surfaces. Secondly, it is difficult to keep the mist suspended and evenly distributed throughout the enclosure. As a result, the levels of smokey flavor and color imparted to the comestible products suspended in the enclosure are often uneven. Furthermore, fans which are required to circulate air through the enclosure must be turned off when the mist is introduced to prevent further unevenness in mist distribution, extending the processing times.

Given the significant advantages inherent in the use of liquid smoke generally, various techniques and types of apparatus have been proposed to "regenerate" liquid smoke into a gaseous or vapor form having the advantages inherent in traditional direct smoking. Proposed liquid smoke vapor regeneration techniques have generally involved heating the liquid smoke to completely volatilize it and then applying the resulting vapor, as in the direct smoking process.

While theoretically highly desirable, in fact, prior vapor regeneration techniques and apparatus have not found commercial acceptance because of the burning of the liquid smoke during the regeneration process which produces an undesirable burned flavor in the resulting product, as well as the build-up of tars on heating surfaces, which interferes with the volatilization process. These tars, it has been found, significantly interfere with heat transfer and, while hot, tend to take fire, producing localized tar fires on the heating surfaces and in ducts which conduct the regenerated vapor to the smoking enclosure. In addition, the liquid smoke regeneration techniques heretofore described have not provided a practical way of tailoring the flavor and color achieved in the smoking process.

It is therefore an object of the present invention to provide an improved liquid smoke regenerator apparatus.

It is another object of the present invention to provide an apparatus for producing, from conventional liquid smoke, a refined liquid smoke vapor and a refined liquid smoke condensate for imparting enhanced smokey flavor and color to comestible products.

It is yet another object of the present invention to provide a liquid smoke regenerator apparatus in which tar build-up on heating surfaces and ducts is reduced or eliminated.

These and other objects of the present invention will become apparent to those skilled in the art upon consideration of the accompanying specification, claims and drawings.

SUMMARY OF THE INVENTION

The present invention comprises an apparatus for regenerating liquid smoke including a regenerator chamber containing a regenerator member with a generally vertical heating surface. The apparatus includes means for introducing liquid smoke onto the surface, means for spreading the liquid smoke onto the surface, and means for heating the regenerator member to regenerate the liquid smoke into a vapor. In one important embodiment, the regenerator member may be an inverted truncated cone, with the generally vertical surface comprising the inner surface of the cone. In this embodiment, the spreading means by be a rotating brush positioned so that is bristles contact the inner surface of the cone as the brush rotates. In another important embodiment, the regenerator member may be a truncated cone, with the generally vertical heating surface being the exterior conical surface of the cone. In this embodiment, the spreading means may be a stationary brush disposed against the outside surface of the cone such, with the cone rotating while the bristles of the brush contact its outer surface.

The present invention thus involves a liquid smoke regenerator apparatus in which tar build-up on heating surfces is eliminated by selectively volatilizing lower boiling point flavor and color constituents of the liquid smoke for application to comestible products and leaving a residue containing higher boiling point constituents, including tars, to be discarded. The composition of the refined smoke vapor and hence the smokey flavor and color which it will impart to a comestible product, may be tailored by regulating the volatilization temperatures in the apparatus. Alternatively, the refined smoke vapor may be condensed into a refined smoke condensate which can be applied directly to comestible products by dipping, coating, spraying or misting, or revolatilizing.

The present invention is therefore directed to an apparatus for producing liquid smoke vapor.

BRIEF DESCRIPTION OF THE DRAWINGS

The features of this invention which are believed to be novel are set forth with particularly in the appended claims. The invention, together with its objects and advantages, may be best understood by reference to the following description taken in conjunction with the accompanying drawings, in which like reference numerals identify like elements in the several figures and in which:

FIG. 1 is a perspective view of an apparatus which may be used in conjunction with the method of the present invention, in which a section of the apparatus has been cut away to reveal its internal structure;

FIG. 2 is a sectional view taken along line 2—2 of FIG. 1;

FIG. 3 is an elevation view of an alternative brush configuration which may be used in the apparatus shown in FIG. 1;

FIG. 7 is a graph of the data reported in Example 1 below.

DESCRIPTION OF THE PREFERRED EMBODIMENT

Figure 4:
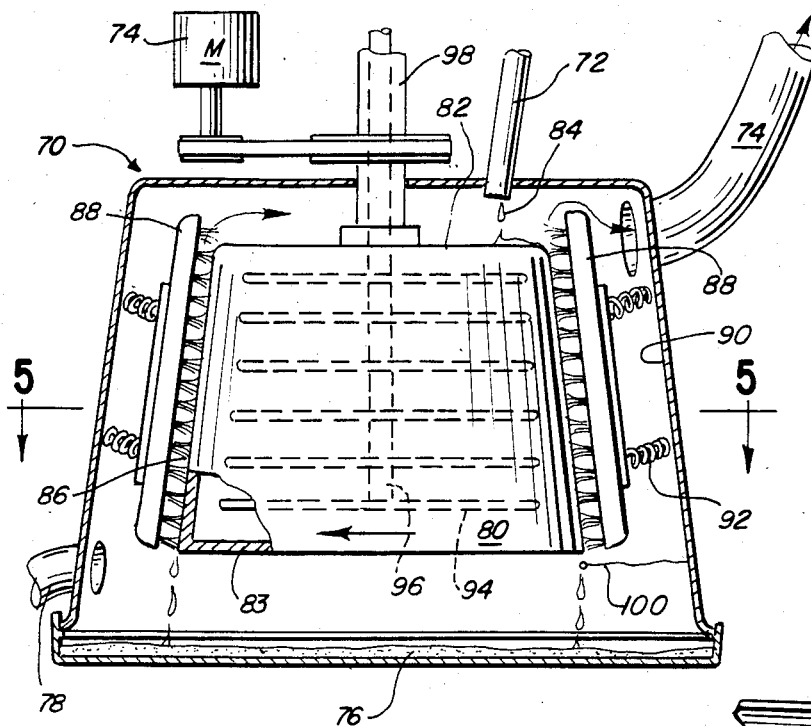
FIG. 4 is an elevation view of an alternative liquid smoke regeneration apparatus in which a front section of the apparatus has been cut away to reveal its internal structure.
Figure 5:
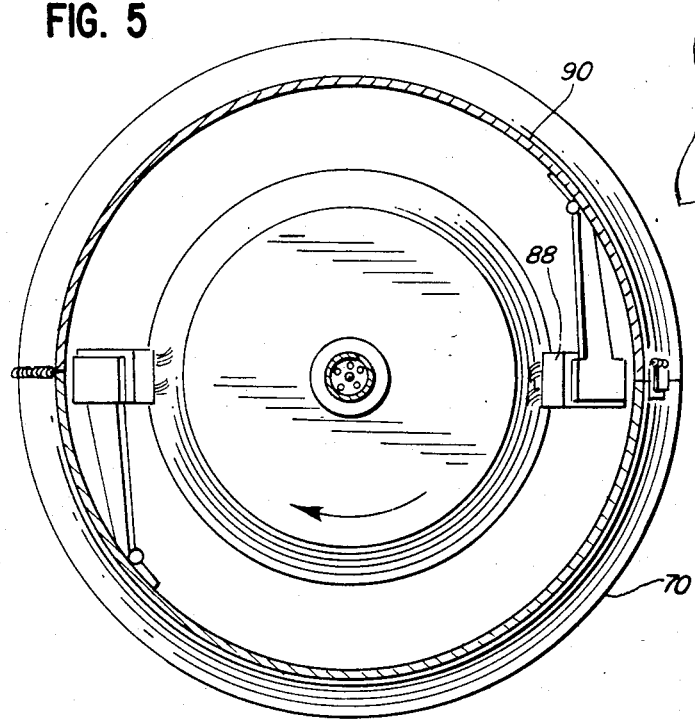
FIG. 5 is a cross-sectional view of the smoke regeneration apparatus of FIG. 4 taken along line 5—5.

The inventive methods and products of the present invention will be described below in connection with operation of the apparatus illustrated in the FIGURES.

Turning now to FIG. 1, comestible products 10 are suspended in a smoke enclosure 12 which is provided with a fan 14 which recirculates heated air (heater not shown) through the smoking enclosure by way of an external conduit 16.

A virtually colorless refined liquid smoke vapor, produced as described hereinafter, is drawn from smoke regeneration apparatus 20 into conduit 16 at junction 18 by way of duct 22 leading from the smoke regeneration apparatus 20. The refined vapor comprises a range of lower boiling point constituents of a conventional liquid smoke which are selectively volatilized as explained hereinafter. The ducts and conduits may be insulated (not shown) to minimize condensation of the vapor before it reaches the smoke enclosure.

Although the refined smoke vapor is conducted directly to the comestible products in smoke enclosure 12 in the FIGURES, alternatively it may be conducted to a conventional condenser apparatus (not shown) and condensed into a refined liquid smoke condensate. The condensate will comprise a range of lower boiling point constituents of the starting liquid smoke determined or "tailored" by the volatilization temperature chosen in the regeneration method. This refined smoke condensate may later be applied directly to comestible products by dipping, coating, spraying, misting or volatilization techniques.

Smoke regeneration apparatus 20 includes an inlet tube 24 into which a conventional, commercially available liquid smoke 26 (such as Griffith Laboratories' Royal Smoke A, B, C, D or H) is metered. The inlet tube is positioned to introduce the liquid smoke into an optional, annular pre-heat well 28 which is most clearly illustrated in FIG. 2.

The apparatus is provided with an open, inverted, truncated cone 30 which meets the inner edge of the pre-heat well about the upper edge 32 of the cone. Both the well and the inverted cone are made of a heat conductive material such as stainless steel. During operation of the apparatus, the cone and well are heated by conventional electrical radiant heating coils 34 or by another practicable heating method. Although the size and shape of the cone employed will vary depending on the smoking requirements of a particular installation, in the embodiment illustrated, the cone is about 10 inches high and about 2 3/4 and 4 inches respectively at the diameters of its lower and upper edges.

Liquid smoke 26 in well 28 is pre-heated to promote efficient volatilization as the liquid smoke overflows cone edge 32 onto inner surface 36 of cone 30. The rate at which the pre-heated liquid flows onto the cone inner surface is dependent on the rate of metering of the liquid entering the apparatus through inlet tube 24. The pre-heated liquid smoke overflowing edge 32 flows generally vertically down the inner surface 36 of the cone under the force of gravity.

Three brushes 40 rest within inverted cone 30 and are rotated by a motor, M, represented schematically at 42, driving a shaft 44. As the brushes rotate about the axis of shaft 44 the brush bristles contact inner surface 36 of the cone along most of its length, spreading and distributing the liquid smoke into a thin film as it spills over edge 32. This brushing action, which is a function not only of the rate of rotation of the brushes but also of brush bristle stiffness and density, increases the residence time of the liquid smoke on surface 36 as it progresses down the surface toward exit point 38 at the lower cone edge. The brushing action also helps maintain maximum heat transfer, continuously removing tars which form on surface 36 so that they may advance downwardly toward the exit point and be readily washed away by the downwardly advancing liquid smoke. In addition, energy contributed by the mechanical action of the rotating brushes contributes to the volatilization of the liquid smoke.

Brushes 40 are mounted to arms 46 which in turn are mounted to shaft 44 in such a fashion that the brushes independently pivot at the point of attachment to the arms and at the point of attachment of the arms to the shaft, to precisely follow the angle of the inner surface of the inverted cone, under the bias of the centrifugal force of the rotating brushes.

The choice of the brush bristles, including their composition, stiffness and bristle density, will be tailored to the operating parameters of the apparatus, including the cone temperature and the rate of rotation of the brushes. In addition, an alternative brush configuration could be used such as that in FIG. 3 in which a single brush 52 with bristles 54 held in place on a twisted central shaft is illustrated. In this alternative embodiment bristles 54 are tapered to correspond to the taper of the cone inner surface 36.

Apparatus 20 includes a vent 60 with damper 62 (FIG. 2) provided at the bottom of the smoke regeneration apparatus to permit control of an air flow opposite to the direction of the downwardly advancing liquid smoke. This counter flow of air carries the refined vapor up through the apparatus, to be drawn through conduit 16 to the smoking enclosure. Additional air may be supplied at opening 63 through which shaft 44 passes.

Liquid smoke 26 may be any liquid smoke prepared by conventional methods such as those described in U.S. Pat. Nos. 3,873,741 or 3,106,473. These and other commercially available liquid smoke products comprise aqueous-based mixtures of a great multitude of different organic compounds. For example, 41 different phenolic components in wood smoke and liquid smokes are identified in "The Chemistry of Smoked Foods, A Review", by J. Gilbert and M. E. Knowles, J. F., Technol. (1975) 10, 245-261. In addition to these 41, many other phenol, carbonyl and other compounds, both identified and unidentified, are present in liquid smoke.

The lower boiling point constituents of liquid smoke, it has been found, contribute most of the desirable smokey flavor and coloring. The higher boiling point constituents, on the other hand, contribute undesirable harsh taste, minimal staining and highly adherent tars which interfere with heat transfer and are readily igniteable when hot. According to the method of the present invention, the lower boiling point constituents are selectively volatilized to the exclusion of the higher boiling point constituents (and without burning the liquid smoke), to obtain a refined vapor for imparting enhanced smokey flavor and color to comestible products.

This selective volatilization is accomplished in the apparatus of FIG. 1 by carefully controlling the heating of the liquid smoke, which is a function of the temperature of cone surface 36, the rate of rotation and density of brushes 40, and the rate at which the liquid smoke progresses down the cone surface. In particular, it has been found that the desired selective volatilization can be accomplished by monitoring the exit temperature of the residue 48 which drips off the cone at exit point 38 into tar reservoir 64, and adjusting the heating by varying the above parameters to maintain the exit temperature at a level which will produce the desired refined smoke vapor. In the illustrated embodiment, the exit temperature is monitored with a thermocouple 66 (FIG. 2), although the exit temperature could be monitored in other conventional ways.

It has been found that the objectives of the present invention including tailored smokey flavor and color of comestible products and elimination of tar build-up on the heated cone surface of the smoke regenerator can be accomplished by maintaining the exit temperature of residue 48 in the range of about 130° to 425° F., and preferably in the range of about 180° to 375° F.

An alternative liquid smoke regeneration apparatus 70 is illustrated in FIG. 4. Again, the apparatus includes a liquid smoke inlet 72, a duct 74 for conducting the refined vapor to the smoking enclosure, a motor 74, a residue reservoir 76 and a dampered air inlet 78. In this embodiment, however, the truncated cone 80 is inverted with its large end at the bottom and its top surface 82 and bottom surface 83 closed. Liquid smoke 84 enters through inlet 72 onto top surface 82 where it is briefly pre-heated as it is moved by centrifugal force to the outer edge of the top surface and down the outer surface 86 of the cone.

This structure differs most significantly from that of FIG. 1 in that truncated cone 80 itself is rotated by a belt or other drive from motor 74, brushes 88 are stationary and disposed against the outside of the cone, and heating means 94 is suspended inside the cone on a non-rotating parent shft 96, which is disposed within outer shaft 98. Thus, unlike in the prior embodiment, here the liquid smoke flows down the cone outer surface 86 as it is spread and distributed by the action of brushes 88.

Figure 6:
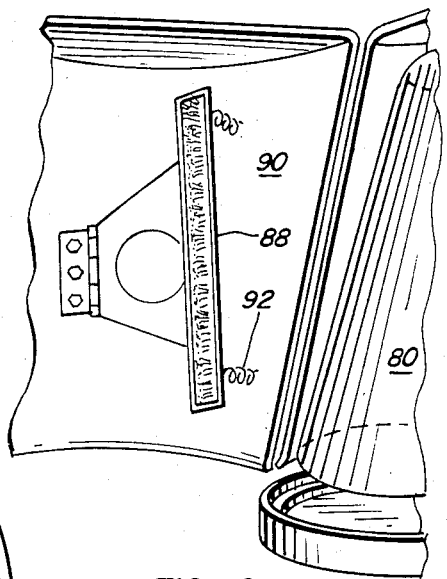
FIG. 6 is an elevation view of a detail of one of the brushes utilized in the apparatus of FIGS. 4 and 5.

Brushes 88 are pivotally attached to the outer wall 90 of the regenerator enclosure, as illustrated in FIG. 6 and biased against the outer cone surface 86 by springs 92. As in the case of the FIG. 1, a thermocouple 100 is located adjacent the bottom edge of the cone to monitor the exit temperature of the residue.

While the present invention is described above, the invention is intended to cover any alternatives, modifications or equivalents that may be included within its sphere and scope, as defined by the appended claims.

The present invention is claimed as follows:

1. An apparatus for regenerating liquid smoke into vapor comprising:
   a regenerator chamber;
   a regenerator member having a generally vertical surface positioned within said chamber;
   means for introducing liquid smoke onto said surface;
   means for spreading the liquid smoke on said surface; and
   means for heating said member to regenerate the liquid smoke into vapor.

2. The apparatus of claim 1 including means for preheating the liquid smoke before it is introduced onto said surface.

3. The apparatus of claim 1 wherein said regeneration member is an inverted, truncated cone and said generally vertical surface comprises the inner surface of said cone.

4. The apparatus of claim 3 wherein said spreading means comprises a plurality of brushes, said apparatus further including means for positioning said brushes so that their bristles bear against said inner surface of said cone.

5. The apparatus of claim 3 wherein said spreading means comprises a brush having a shaft positioned along the axis of said cone with bristles tapered to correspond to said inner surface of said cone.

6. The apparatus of claim 1 wherein said cone is made of stainless steel.

7. The apparatus of claim 1 wherein said heating means comprises electrical radiant heating coils.

8. The apparatus of claim 1 wherein said spreading means comprises a brush.

9. The apparatus of claim 8 wherein said spreading means comprises a rotating brush positioned so that its bristles contact said surface as said brush rotates.

10. The apparatus of claim 1 including means for continuously removing from said surface tars formed during the regeneration of the liquid smoke.

11. The apparatus of claim 1 including means for condensing the vapor into a refined liquid smoke condensate.

12. The apparatus of claim 1 including a smoke enclosure for imparting smokey flavor and color to a comestible product and means for conducting the vapor from said regenerator chamber into said smoke enclosure.

13. The apparatus of claim 1 including a vent for admitting air to said regenerator chamber.

14. The apparatus of claim 1 including means for withdrawing the vapor.

15. The apparatus of claim 1 wherein a residual liquid remains after the liquid smoke is regenerated into a vapor and said apparatus includes means for monitoring the temperature of the residual liquid and means for adjusting the temperature of the heating means in response thereto.

16. The apparatus of claim 1 wherein said regeneration member is a truncated cone closed at top and bottom, and said generally vertical surface is the exterior conical surface of said cone.

17. The apparatus of claim 16 wherein said spreading means comprises a stationary brush disposed against the outside surface of said cone and means for rotating said cone while the bristles of said brush contact said outside surface of said cone.

18. An apparatus for regenerating liquid smoke into vapor comprising:
a regenerator chamber;
a regenerator member comprising an inverted, truncated cone positioned within said chamber;
means for preheating the liquid smoke;
means for introducing the liquid smoke onto the inner surface of said cone;
means for spreading the liquid smoke on said inner surface of said cone;
means for heating said member to regenerate the liquid smoke into vapor; and
means for withdrawing the vapor.

19. The apparatus of claim 18 wherein said spreading means comprises a rotating brush with bristles which bear against said inner surface of said cone.

20. An apparatus for regenerating liquid smoke into vapor comprising:
a regenerator chamber;
a regenerator member comprising a truncated cone positioned within said chamber;
means for preheating the liquid smoke;
means for introducing the liquid smoke onto the outer surface of said cone;
means for spreading the liquid smoke on outer surface of said cone;
means for heating said member to regenerate the liquid smoke into vapor; and
means for withdrawing the vapor.

* * * * *